United States Patent
Fujioka

(10) Patent No.: US 10,787,038 B2
(45) Date of Patent: Sep. 29, 2020

(54) PNEUMATIC TIRE

(71) Applicant: Toyo Tire & Rubber Co., Ltd., Osaka-shi, Osaka (JP)

(72) Inventor: Tsuyoshi Fujioka, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 523 days.

(21) Appl. No.: 15/621,198

(22) Filed: Jun. 13, 2017

(65) Prior Publication Data
US 2018/0001708 A1 Jan. 4, 2018

(30) Foreign Application Priority Data

Jun. 30, 2016 (JP) .................................. 2016-130580

(51) Int. Cl.
*B60C 11/03* (2006.01)
*B60C 11/12* (2006.01)
(Continued)

(52) U.S. Cl.
CPC ........... *B60C 11/0306* (2013.01); *B60C 11/11* (2013.01); *B60C 11/1218* (2013.01);
(Continued)

(58) Field of Classification Search
CPC ................... B60C 11/0306; B60C 15/0009; B60C 15/024
See application file for complete search history.

(56) References Cited

U.S. PATENT DOCUMENTS

2011/0083777 A1   4/2011  Hidrot et al.
2011/0303333 A1*  12/2011 Muto ................... B60C 11/0306
                                                152/209.25
(Continued)

FOREIGN PATENT DOCUMENTS

CN     102282027 A   12/2011
JP     2016-97822 A   5/2016

OTHER PUBLICATIONS

Office Action dated Dec. 17, 2018, issued in counterpart CN Application No. 201710440968.X, with English machine translation. (10 pages).

*Primary Examiner* — Jacob T Minskey
*Assistant Examiner* — Melody Tsui
(74) *Attorney, Agent, or Firm* — Westerman, Hattori, Daniels & Adrian, LLP

(57) ABSTRACT

A pneumatic tire includes a tread portion that is provided with two block rows formed of three circumferential grooves and a plurality of first transverse grooves. A block that configures the block rows has a hexagonal shape, and has a diagonal extension line passing through a pair of vertices positioned in the central portion in the tire-circumferential direction, the diagonal extension line overlapping, in the tire-circumferential direction, the first transverse groove of the adjacent block rows. The block has a first sipe that is terminated within a block extending in the tire-width direction. The first sipe is provided at a position shifted from the diagonal extension line in the tire-circumferential direction and in a region interposed between planes that are formed by extending, in a direction in which the first transverse groove extends, from a pair of groove wall surfaces of the first transverse groove of the adjacent block rows.

10 Claims, 7 Drawing Sheets

(51) Int. Cl.
*B60C 11/11* (2006.01)
*B60C 15/00* (2006.01)
*B60C 15/024* (2006.01)
*B60C 99/00* (2006.01)

(52) U.S. Cl.
CPC ........ *B60C 15/0009* (2013.01); *B60C 15/024* (2013.01); *B60C 99/00* (2013.01); *B60C 2011/0341* (2013.01); *B60C 2011/0344* (2013.01); *B60C 2011/0346* (2013.01); *B60C 2011/0353* (2013.01); *B60C 2011/0355* (2013.01); *B60C 2011/1213* (2013.01); *B60C 2011/1254* (2013.01)

(56) References Cited

U.S. PATENT DOCUMENTS

| | | | |
|---|---|---|---|
| 2014/0158261 A1 | 6/2014 | Takahashi | |
| 2016/0137005 A1* | 5/2016 | Maehara | B60C 11/0327 |
| | | | 152/209.25 |
| 2017/0106702 A1* | 4/2017 | Ito | B60C 11/0306 |

* cited by examiner

PNEUMATIC TIRE

BACKGROUND OF THE INVENTION

Field of the Invention

The embodiment relates to a pneumatic tire.

Background Art

A tire having a block pattern, in which a tread portion of a pneumatic tire is provided with a plurality of circumferential grooves extending in a tire-circumferential direction and transverse grooves in raised portion comparted by the circumferential grooves such that block rows formed of plurality of blocks are provided, has been known.

In the tire having such a tread pattern, in order to enhance traction performance on a wet road surface, sipes that are opened in the circumferential grooves are provided in the blocks in some cases (refer to US 2014/0158261 A1 and US 2011/0083777 A1).

However, when the sipes are opened in the circumferential grooves, block rigidity is degraded, a large amount of collapse occurs in the block, and thereby uneven wear is likely to occur. When the sipes are terminated in the block, it is possible to reduce degradation of the block rigidity; however, since the sipes are not opened in the circumferential grooves, traction effects achieved by the sipes decrease.

In consideration of such points described above, an object of the embodiment is to provide a pneumatic tire in which it is possible to reduce degradation of block rigidity due to sipes such that it is possible to improve traction performance and uneven wear resistance in a tire having a block pattern.

SUMMARY OF THE INVENTION

According to the embodiment, there is provided a pneumatic tire including a tread portion. The tread portion is provided with three circumferential grooves extending to have a zigzag shape in a tire-circumferential direction, a plurality of first transverse grooves that connect the circumferential grooves adjacent to each other in a tire-width direction and extend in the tire-width direction, and two block rows provided between the circumferential grooves adjacent to each other in the tire-width direction. The block row is provided with a plurality of blocks divided by the first transverse grooves in the tire-circumferential direction. The block has a hexagonal shape of which the central portion in the tire-circumferential direction is widened in the tire-width direction, has a diagonal extension line as a straight line passing through a pair of vertices positioned in the central portion in the tire-circumferential direction, the diagonal extension line overlapping, in the tire-circumferential direction, the first transverse groove of the adjacent block rows, and has a first sipe that is terminated within a block extending in the tire-width direction. The first sipe is disposed at a position shifted from the diagonal extension line in the tire-circumferential direction and in a region interposed between planes that are formed by extending, in a direction in which the first transverse groove extends, from a pair of groove wall surfaces of the first transverse groove provided in the adjacent block rows.

DETAILED DESCRIPTION OF THE INVENTION

Figure 1:
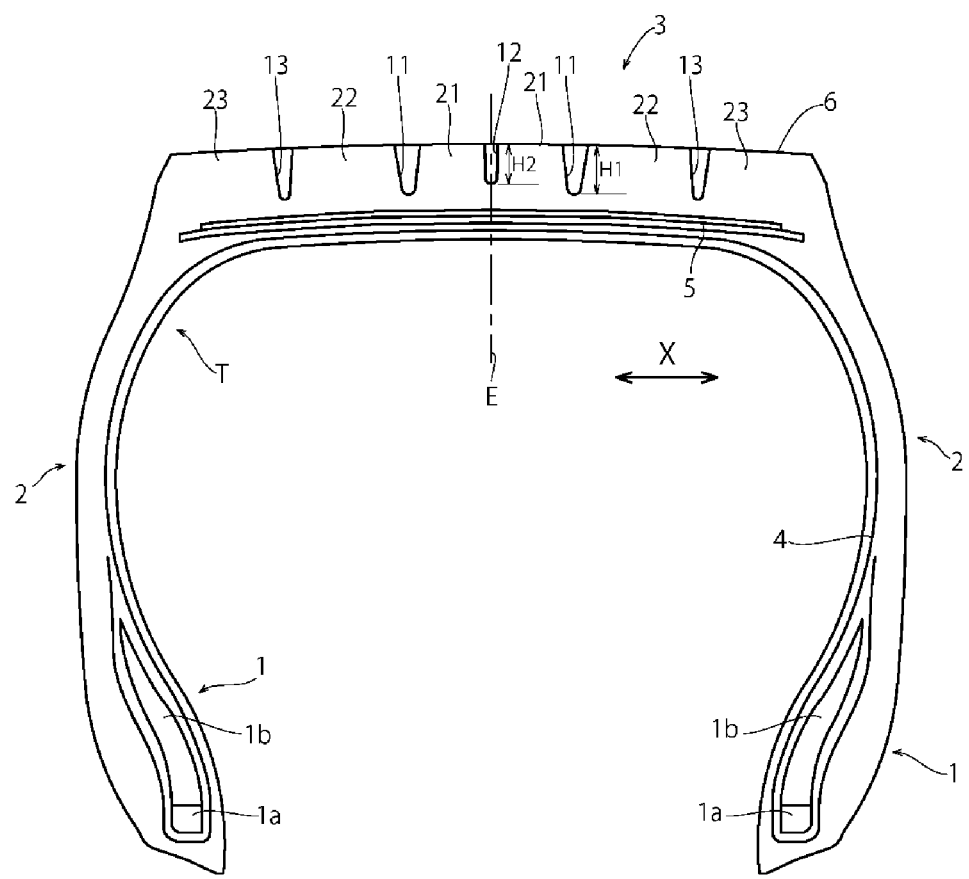
FIG. 1 is a sectional view taken along the meridian of a tire so as to illustrate an example of a pneumatic tire according to a first embodiment.

Hereinafter, embodiments of the invention will be described with reference to the accompanying figures. FIG. 1 is a sectional view taken along the meridian of a tire so as to illustrate an example of a pneumatic tire T according to the embodiment.

The pneumatic tire T includes a pair of bead portions 1, sidewall portions 2 which extend outward from the bead portions 1 in a tire-radial direction, respectively, and a tread portion 3 which connects both outer ends of the sidewall portions 2 to each other in the tire-radial direction thereof. The bead portion 1 is provided with an annular bead core 1a and a bead filler 1b. A toroidal carcass 4 is disposed between the pair of bead portions 1. An end portion of the carcass 4 is folded via the bead core 1a. In the figures, reference sign E represents a tire equatorial plane as a virtual plane passing through the center in a tire-width direction X.

The carcass 4 is formed by coating, with topping rubber, ply cords arranged in a direction that is substantially orthogonal to a tire-circumferential direction Y. Steel cords or organic fiber cords are appropriately used as the ply cords.

Belts 5 are stacked in outer circumference of the carcass 4 of the tread portion 3, and tread rubber 6 is provided in further outer circumference therefrom. The belt 5 is formed of one or a plurality of steel belt layers in which steel cords are arranged at an angle of 10° to 35° with respect to the tire-circumferential direction Y. In this example, the belt is formed of two steel belt layers.

A front surface of the tread portion 3 is provided with three or more circumferential grooves extending in the tire-circumferential direction Y, a plurality of transverse grooves that are connected to the circumferential grooves and extend in the tire-width direction X, and a plurality of block rows formed by being comparted by the circumferential grooves and the transverse grooves.

Figure 2:
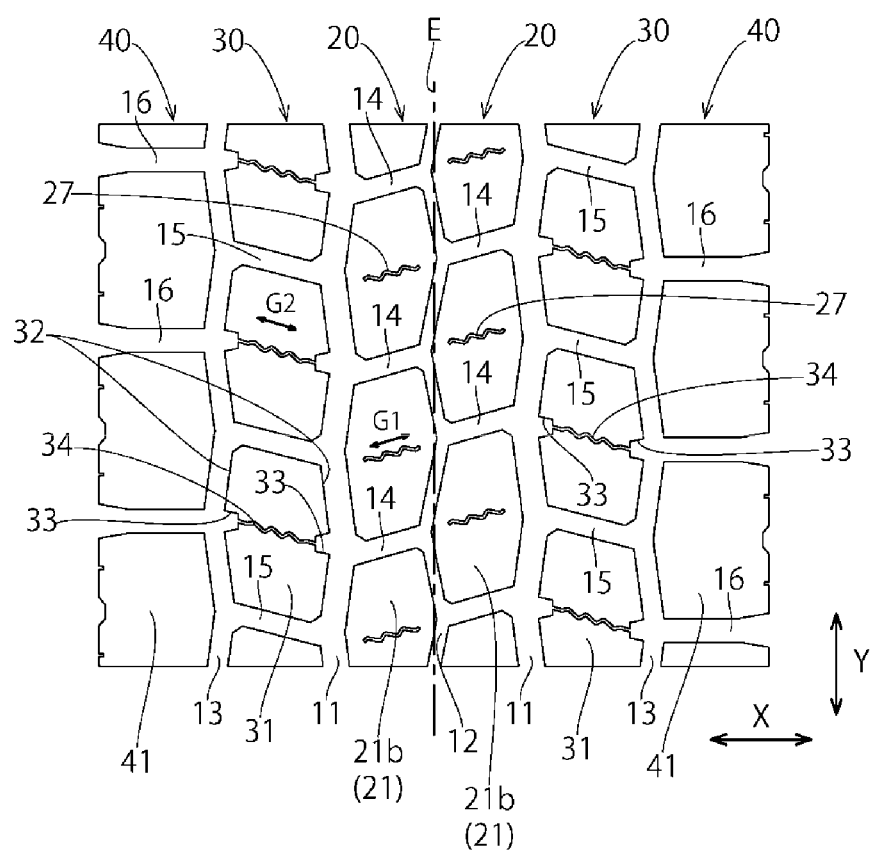
FIG. 2 is a development view illustrating main parts of a tread portion of the pneumatic tire in FIG. 1.

Specifically, as illustrated in FIG. 2, the tread portion 3 is provided with a total of five circumferential grooves of a pair of first circumferential grooves 11 and 11 that is provided at an interval in the tire-width direction X with the tire equatorial plane interposed therebetween, a second circumferential groove 12 provided between the first circumferential grooves 11 and 11, and a pair of third circumferential grooves 13 and 13 provided on outer sides of the first circumferential grooves 11 and 11 in the tire-width direction X.

The pair of first circumferential grooves 11 and 11 is a zigzag-shaped groove that extends in the tire-circumferential direction Y while a bent portion is repeated alternately on one side and on the other side in the tire-width direction X. In this example, the pair of first circumferential grooves 11 and 11 is bent at repetitive pitches of the same length as each other. The pair of first circumferential grooves 11 and 11 has bent positions different in the tire-circumferential direction Y from each other. Two center block rows 20 and 20, which are adjacent to each other in the tire-width direction X with the second circumferential groove 12 interposed therebetween, are comparted between the pair of first circumferential grooves 11 and 11.

The second circumferential groove 12 is a zigzag-shaped groove that extends in the tire-circumferential direction Y while a bent portion is repeated alternately on one side and on the other side in the tire-width direction X. In this example, the second circumferential groove 12 is provided on the tire equatorial plane E. The second circumferential groove 12 is bent at repetitive pitches of the same length as the pair of first circumferential grooves 11 and 11 adjacent to each other on the outer side in the tire-width direction X. The second circumferential groove 12 has bent positions different from the pair of first circumferential grooves 11 and 11 in the tire-circumferential direction Y.

Figure 3:
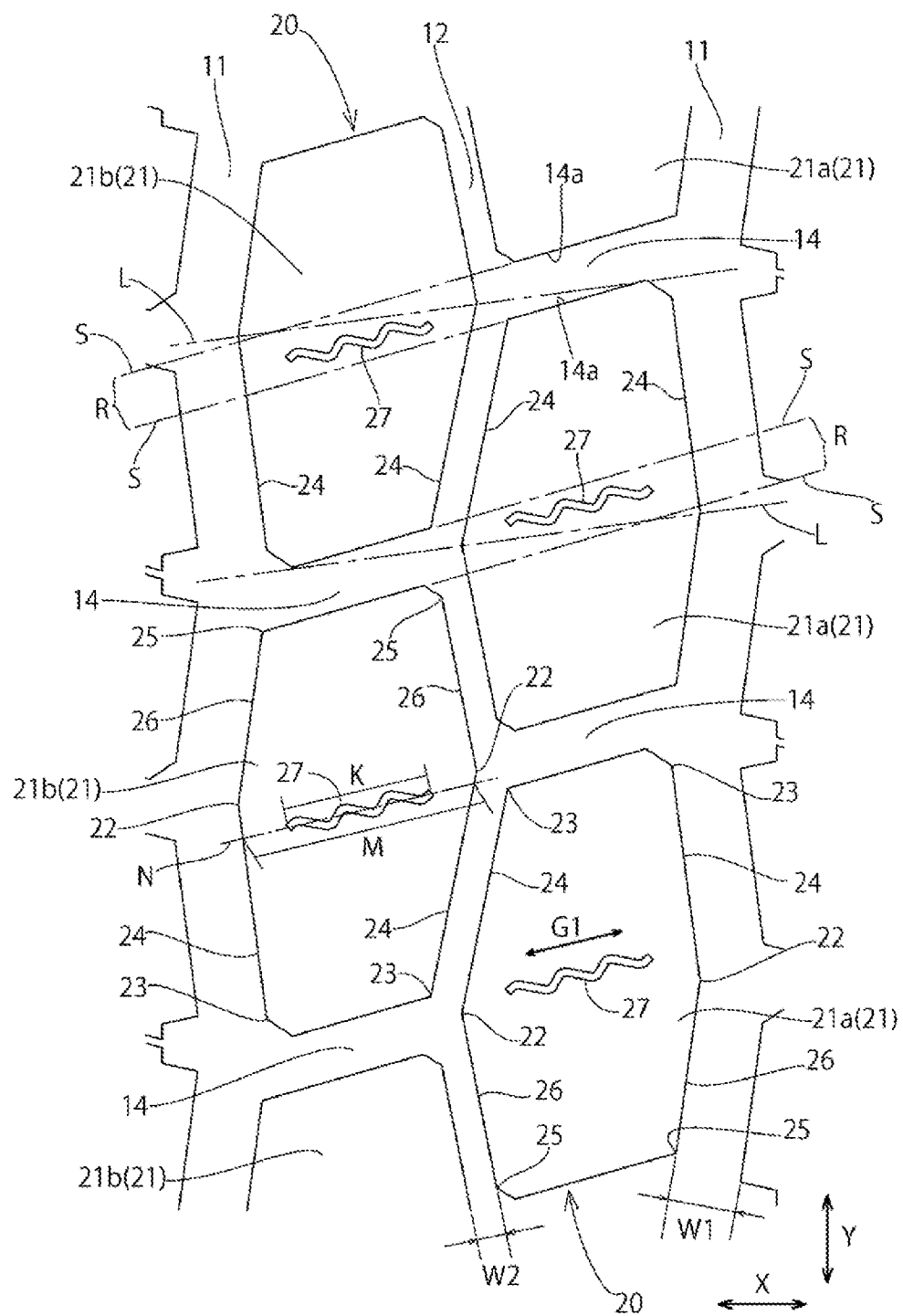
FIG. 3 is an enlarged view of main parts in FIG. 2.

A groove width W2 of the second circumferential groove 12 is set to be narrower than a groove width W1 of the first circumferential groove 11 (refer to FIG. 3). It is preferable that opposite surfaces of the two center block rows 20 and 20 come into contact with each other when the tire comes into contact with the ground (when the pneumatic tire T is subjected to rim assemblage with a normal rim, the tire is placed perpendicularly to a flat road surface in a state in which the tire is filled with a normal internal pressure, and a normal load is applied thereto). In other words, it is preferable that the second circumferential groove 12 is provided in a closed gap when the tire comes into contact with the ground. In addition, a depth H2 of the second circumferential groove 12 is set to be shallower than a depth H1 of the first circumferential groove 11 (refer to FIG. 1).

Note that, in a standard system including standards on which the tire is based, the normal rim means a rim that is formed by corresponding standards that are specified for each tire, and examples thereof include a standard rim in the JATMA Standards, a "design rim" in the TRA Standards, and a "measuring rim" in the ETRTO Standards.

In a standard system including standards on which the tire is based, the normal internal pressure means air pressure having standards which are specified for each tire. The normal internal pressure means the "maximum air pressure" in the JATMA Standards, the maximum value specified in "tire load limits at various cold inflation pressures" in the TRA Standards, and an "inflation pressure" in the ETRTO Standards. In a case where the tire is used for a passenger car, the normal internal pressure is 180 KPa. In addition, in a standard system including standards on which the tire is based, a normal load means a load which is specified for each tire. The normal load is the maximum load capacity according to the JATMA, the maximum value specified in table described above according to the IRA, and the "load capacity" according to the ETRTO. In a case where the tire is used for the passenger car, the load corresponding to the internal pressure of 180 KPa is 85%.

Such a second circumferential groove 12 divides, in the tire-width direction X, a region interposed between the pair of first circumferential grooves 11. The second circumferential groove 12 comparts and forms the two center block rows 20 and 20 between the first circumferential grooves 11. The center block rows 20 and 20 are provided with a plurality of center blocks 21 divided by a plurality of first transverse grooves 14 in the tire-circumferential direction Y. Similar to the first circumferential grooves 11 and 11 or the second circumferential groove 12, the pair of third circumferential grooves 13 and 13 is a zigzag-shaped groove that extends in the tire-circumferential direction Y while a bent portion is repeated alternately on one side and on the other side in the tire-width direction X. The third circumferential grooves 13 and 13 are bent at repetitive pitches of the same length as the first circumferential grooves 11 and 11 or the second circumferential groove 12. The third circumferential grooves 13 and 13 have bent positions different from the first circumferential grooves 11 and 11 or the second circumferential groove 12 in the tire-circumferential direction Y.

The third circumferential grooves 13 and 13 compart and form outer block rows 30 between the pair of first circumferential grooves 11 and 11 adjacent to each other in the tire-width direction X. The outer block row 30 is provided with a plurality of outer blocks 31 divided by a plurality of second transverse grooves 15 in the tire-circumferential direction Y. In addition, the third circumferential grooves 13 and 13 compart and form shoulder block rows 40 and 40 on the outer side in the tire-width direction X. The shoulder block rows 40 and 40 are provided with a plurality of shoulder blocks 41 divided by a plurality of third transverse grooves 16 in the tire-circumferential direction Y.

The plurality of first transverse grooves 14 are formed between the pair of first circumferential grooves 11 and 11 and extend in the tire-width direction X. The first transverse groove 14 is provided to connect vertices of the first circumferential grooves 11 and 11 and vertices of the second circumferential groove 12 which are bent to have a zigzag shape. In this example, the plurality of first transverse grooves 14 are inclined to one side (upper right side in FIG. 2) in the tire-circumferential direction Y with respect to the tire-width direction X. In addition, the plurality of first transverse grooves 14 are provided to be parallel to each other.

Such first transverse grooves 14 divide, in the tire-circumferential direction Y, a region formed between the first circumferential grooves 11 and 11 and the second circumferential groove 12. In this manner, the first transverse grooves 14 compart and form the center block row 20 in which a plurality of center blocks 21 are arranged in parallel in the tire-circumferential direction Y.

The plurality of second transverse grooves 15 are formed between the first circumferential grooves 11 and 11 and the third circumferential grooves 13 and 13 and extend in the tire-width direction X. The second transverse groove 15 is provided to connect vertices of the first circumferential grooves 11 and 11 and vertices of the third circumferential grooves 13 which are bent to have a zigzag shape. In this example, the plurality of second transverse grooves 15 are inclined in an opposite direction to the first transverse groove 14 with respect to the tire-width direction X. In other words, the plurality of second transverse grooves 15 are inclined to the other side (lower right side in FIG. 2) in the tire-circumferential direction Y with respect to the tire-width direction X. In addition, the plurality of second transverse grooves 15 are provided to be parallel to each other.

Such second transverse grooves 15 divide, in the tire-circumferential direction Y, a region formed between the first circumferential grooves 11 and 11 and the third circumferential grooves 13 and 13. In this manner, the second transverse grooves 15 compart and form the outer block row 30 in which a plurality of outer blocks 31 are arranged in parallel in the tire-circumferential direction Y.

The plurality of center blocks 21 that configure the center block row 20 are raised portions having a hexagonal shape comparted in the tread rubber 6, by the first circumferential grooves 11 and 11, the second circumferential groove 12, and the first transverse grooves 14.

The center block 21 has the hexagonal shape in which a gap between a pair of vertices 22 and 22 positioned in the central portion in the tire-circumferential direction Y is longer than end portions thereof in the tire-circumferential direction Y, and thus the central portion in the tire-circumferential direction Y is widened in the tire-width direction X. Note that the hexagonal shape in the specification includes not only the hexagonal shape having six vertices, but also a shape of which vertices positioned at end portions in the tire-circumferential direction Y are blunted as in the block 21 illustrated in FIG. 2 or the vertices are rounded.

As illustrated in FIG. 3, in the center block 21, the pair of vertices 22 and 22 positioned in the central portion in the tire-circumferential direction Y is positioned at the vertices of the first circumferential grooves 11 and the second circumferential groove 12 which are bent to have the zigzag shape. In the center block 21, a straight line (hereinafter, the straight line referred to as a diagonal extension line L) passing through the pair of vertices 22 and 22 positioned in the central portion in the tire-circumferential direction Y overlaps the first transverse groove 14 of the adjacent center block row 20, in a plan view.

In addition, a center block 21a, which configures one block row 20 (for example, the center block row on the right side in FIG. 3) of the two center block rows 20 and 20, has side portions 24 and 24 (hereinafter, the side portions referred to as long side portions 24 and 24 in some cases) that extend from a pair of vertices 22 and 22 positioned in the central portion in the tire-circumferential direction Y to vertices 23 and 23 adjacent to each other on one side (upper side in FIG. 3) in the tire-circumferential direction Y, and side portions 26 and 26 (hereinafter, the side portions referred to as short side portions 26 and 26 in some cases) that extend from the vertices 22 and 22 to vertices 25 and 25 adjacent to each other on the other side (lower side in FIG. 3) in the tire-circumferential direction Y. The long side portions 24 and 24 are longer than the short side portions 26 and 26.

A center block 21b, which configures the other block row 20 (for example, the block row on the left side in FIG. 3) of the two center block rows 20 and 20, has a shape that matches the center block 21a that configures one center block row 20 when 180-degree rotation is performed with the tire-radial direction as a rotary axis. Specifically, the center block 21b has short side portions 26 and 26 extending from the pair of vertices 22 and 22 positioned in the central portion in the tire-circumferential direction Y to vertices 25 and 25 adjacent to each other on one side (upper side in FIG. 3) in the tire-circumferential direction Y, and long side portions 24 and 24 that extend from the vertices 22 and 22 to vertices 23 and 23 adjacent to each other on the other side (lower side in FIG. 3) in the tire-circumferential direction Y. The long side portions 24 and 24 are longer than the short side portions 26 and 26 in the center block 21b.

In this example, the long side portion 24 of the center block 21a that configures the one center block row 20 is opposite to the long side portion 24 of the center block 21b that configures the other center block row 20, with the second circumferential groove 12 interposed therebetween. The short side portion 26 of the one center block 21a is opposite to the short side portion 26 of the center block 21b, with the second circumferential groove 12 interposed therebetween.

In addition, in this example, a part of the center block 21a that configures the one center block row 20 is disposed to overlap, in the tire-width direction X, the center block 21b that configures the other center block row 20.

Such center blocks 21 and 21 are provided with a first sipe 27 that extends substantially in parallel with the first transverse groove 14. Both ends of the first sipe 27 are not opened to an edge of the block, but are cut in. In other words, the first sipe 27 is not opened in the first circumferential grooves 11 and the second circumferential groove 12 but is cut in to be terminated in the block 21. As illustrated in FIG. 3, the first sipe 27 is provided at a position shifted in the tire-circumferential direction Y so as not to overlap the diagonal extension line L that passes through the vertices 22 and 22 of the center block 21.

Further, the first sipe 27 is provided in a region R interposed between planes S and S that are formed by extending, in a direction in which the first transverse groove 14 extends, from a pair of groove wall surfaces 14a and 14a that comparts the first transverse grooves 14 of the center block row 20 adjacent to each other in the tire-width direction X. Preferably, the sipe is provided at a position shifted from the diagonal extension line L described above to the long side portion 24 of the center block 21 side.

Figure 4:
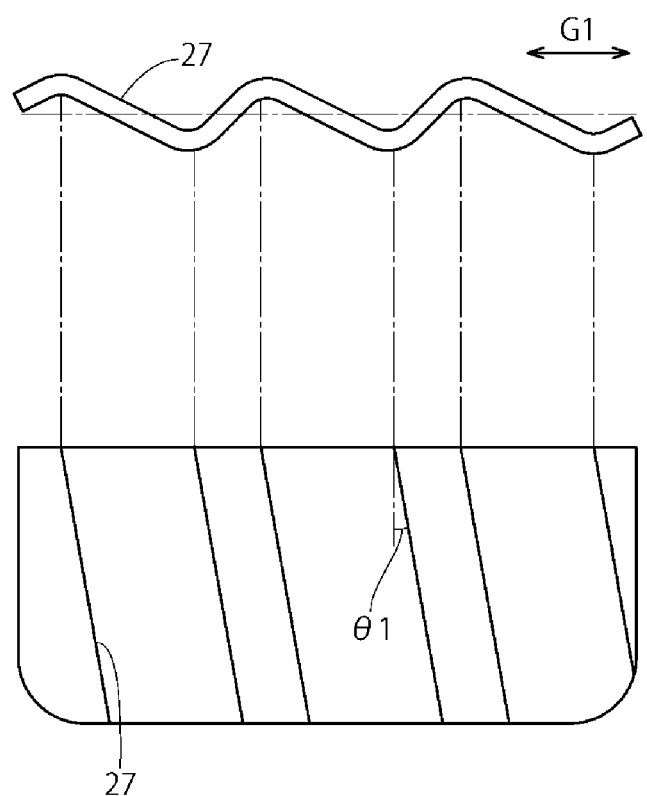
FIG. 4 is a plan view of a first sipe and a view illustrating an inner wall surface of the first sipe.

In this example, as illustrated in an upper figure in FIG. 4, the first sipe 27 has, in a plan view, a wave shape extending in a sipe-length direction G1 while a curve and a bent portion are repeated, and has a wave shape having a cross-sectional shape parallel to the tread surface which has amplitude in the sipe-width direction. In addition, as illustrated in the lower figure in FIG. 4, the first sipe 27 extends in a sipe-depth direction while the wave shape is displaced to one side (right side in FIG. 4) in the sipe-length direction G1.

Note that there is no particular limitation on a length (length in the length direction G1) K of the first sipe 27 as long as the sipe is terminated in the center block 21; however, it is preferable that the length is 40% to 80% of a width (length of the center block 21 along a straight line N that is obtained through extension of the first sipe 27 in the length direction G1 caused to extend in the length direction G1) M of the center block 21 at a position at which the first sipe 27 is provided (refer to FIG. 3). The length K of the first sipe 27 is 40% or higher of the width M of the center block 21, and thereby it is easy to exhibit edge effects of the sipe such that it is possible to improve the traction performance. The length is 80% or lower of the width M of the center block 21, and thereby it is possible to reduce generation of cracks at the end portion of the first sipe 27.

There is no particular limitation on the sipe depth of the first sipe 27; however, it is preferable that the sipe depth is 30% to 70% of the depth of the first circumferential grooves 11. The sipe depth of the first sipe 27 is 30% or higher of the depth of the first circumferential groove 11, and thereby it is easy to exhibit edge effects of the sipe such that it is possible to improve the traction performance. The depth is 70% or lower of the depth of the first circumferential groove 11, and thereby it is possible to secure rigidity of the center block 21 and it is possible to reduce uneven wear of the center block 21.

In addition, it is preferable that an inclination angle θ1 of the first sipe 27 with respect to the sipe-depth direction is 5° to 30° (refer to FIG. 4). The inclination angle θ1 is 5° or higher, and thereby the sipe inner wall surface easily meshes. It is possible to improve the rigidity of the center block 21, and thereby it is possible to reduce uneven wear. The inclination angle θ1 of 30° or lower causes a meshing force of the sipe inner wall surface not to excessively increase, and thus it is possible to reduce generation of cracks due to rubbing on the sipe inner wall surface.

The plurality of outer blocks 31 that configure the outer block row 30 are the raised portion comparted in the tread rubber 6, by the first circumferential grooves 11 and 11, the third circumferential groove 13, and the second transverse groove 15.

The outer block 31 is provided with notches 33 and 33 in the central portion in the tire-circumferential direction Y of a pair of side walls 32 and 32 facing the first circumferential grooves 11 and the third circumferential groove 13. The notch 33 has a substantially rectangular recessed portion in a plan view and is opened in the circumferential grooves 11 or 13 that are cut off toward the groove bottom of the first circumferential groove 11 or the third circumferential groove 13 from the top surface of the block.

The outer block 31 is provided with a second sipe 34 that is opened to the notch 33 and connects the notches 33 and 33 on both sides to each other in the tire-width direction X.

The second sipe 34 extends in parallel with the second transverse groove 15, both ends of the sipe are opened to the notch 33, and thereby the outer block 31 is provided to cross the outer block 31 in the tire-width direction X.

Figure 5:
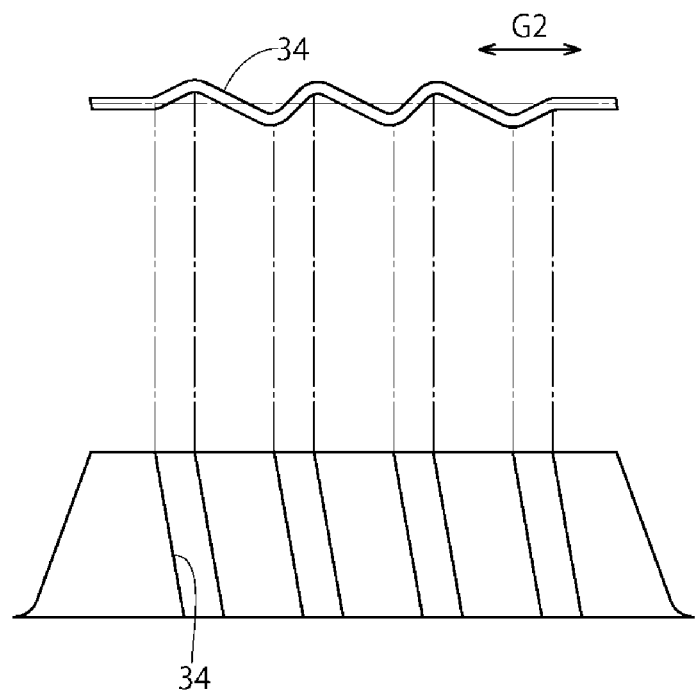
FIG. 5 is a plan view of a second sipe and a view illustrating an inner wall surface of the second sipe.

In this example, as illustrated in an upper figure in FIG. 5, the second sipe 34 has, in a plan view, a wave shape extending in a sipe-length direction G2 while a curve and a bent portion are repeated, and has a wave shape having a cross-sectional shape parallel to the tread surface which has amplitude in the sipe-width direction. In addition, as illustrated in the lower figure in FIG. 5, the second sipe 34 extends in a sipe-depth direction while the wave shape is displaced to one side (right side in FIG. 5) in the sipe-length direction G2.

Note that there is no particular limitation on the sipe depth of the second sipe 34; however, it is possible for the second sipe 34 to have the same depth as the notch 33, and it is preferable that the sipe depth is 30% to 70% of the depth of the first circumferential grooves 11 or the third circumferential groove 13. The sipe depth of the second sipe 34 is 30% or higher of the depth of the first circumferential groove 11 or the third circumferential groove 13, and thereby it is easy to exhibit the edge effects of the sipe such that it is possible to improve the traction performance. The depth is 70% or lower of the depth of the first circumferential groove 11 or the third circumferential groove 13, and thereby it is possible to secure rigidity of the outer block 31 and it is possible to reduce uneven wear of the outer block 31.

In the pneumatic tire T according to the embodiment as described above, the center blocks 21 formed between the first circumferential grooves 11 and 11 and the second circumferential groove 12 is provided with the first sipe 27 that is terminated in the block. Therefore, it is possible to reduce degradation of the block rigidity, and it is possible to improve the traction performance due to the edge effects of the first sipe 27.

In addition, the first sipe 27 is disposed at a position shifted from the diagonal extension line L in the tire-circumferential direction Y, the diagonal extension line L connecting the first pair of vertices 22 and 22 positioned in the central portion in the center block 21 in the tire-circumferential direction Y and in the region R interposed between planes S and S that are formed by extending, in a direction in which the first transverse groove 14 extends, from the pair of groove wall surfaces 14a and 14a of the first transverse groove 14 of the adjacent center block rows 20. Therefore, the first sipe 27, which exhibits the traction performance during tire rolling, or the vertices 22, 23, and 25 of the center block 21 are disposed to be dispersed in the tire-circumferential direction Y, and thus it is possible to efficiently generate the traction.

Moreover, the first sipe 27 is disposed in the region R interposed between the planes S and S that are formed by extending, in a direction in which the first transverse groove 14 extends, from the pair of groove wall surfaces 14a and 14a of the first transverse groove 14, and is provided substantially in the central portion of the center block 21. Therefore, it is possible to achieve uniform ground-contact pressure in the center block 21 and thus it is possible to reduce uneven wear.

In the embodiment, the first sipe 27 provided in the center block 21 has, in the plan view, the wave shape extending in the sipe-length direction G1 while a curve and a bent portion are repeated, and extends in a sipe-depth direction while the wave shape is displaced to one side in the sipe-length direction G1. In this manner, the meshing force of the sipe inner wall surface opposite to the first sipe 27 increases, and thereby it is possible to enhance the rigidity of the center block 21 such that it is possible to reduce uneven wear.

In addition, in the embodiment, the first sipe 27 is provided at the position shifted from the diagonal extension line L to the long side portion 24 side of the center block 21, and thereby it is possible to dispose the first sipe 27 in the vicinity of the central portion of the center block 21 even when the first sipe 27 is disposed to be shifted from the diagonal extension line L in the tire-circumferential direction. The first sipe 27 is disposed to be shifted as described above, and thereby it is possible to achieve both of the improvement of the traction performance and a high level of evenness of the ground-contact pressure.

In addition, in the embodiment, the groove width W2 of the second circumferential groove 12 that divides, in the tire-width direction X, the center block row 20 disposed between the pair of first circumferential grooves 11 is set to be narrower than the groove width W1 of the first circumferential groove 11. In addition, it is possible to increase a ground-contact area of the central portion in the tire-width direction, which has high ground-contact pressure of the tread portion 3, and it is possible to uniform the ground-contact pressure in the tread portion 3.

In addition, the outer block 31, which configures the outer block row 30 provided on the outer side of the center block row 20 in the tire-width direction X, is provided with a notch 33 in the central portion in the tire-circumferential direction, and a second sipe 34. Therefore, it is possible to improve the traction performance due to the edge effects of the notch 33 and the second sipe 34.

Moreover, the second sipe 34 has, in the plan view, the wave shape extending in the sipe-length direction G2 while a curve and a bent portion are repeated, and extends in the sipe-depth direction while the wave shape is displaced to one side in the sipe-length direction G2. Therefore, the meshing force of the sipe inner wall surface opposite to the second sipe 34 increases, and thereby it is possible to enhance the rigidity of the outer block 31 such that it is possible to reduce uneven wear.

In addition, the second transverse groove 15, which comparts the outer block 31 in the outer block row 30, is inclined in an opposite direction to the first transverse groove 14 provided in the center block row 20. In this manner, movement of the center blocks 21 in the center block row 30 and movement of the outer blocks 31 in the outer block row 20 are counteracted against each other, and it is possible to reduce the entire movement of the tread rubber 6 such that it is possible to improve the wear resistance.

Note that dimensions in the specification are considered to be measured in a normal state in which the pneumatic tire is mounted on a normal rim, is filled with the normal internal pressure, and no load is applied, except for a case where the dimension is particularly defined.

Second Embodiment

A pneumatic tire according to the second embodiment is described with reference to FIG. 6.

The second embodiment differs from the first embodiment in that the outer block 31 that configures the outer block row 30 is not provided with the notch 33 and the second sipe 34. Even in this case, it is possible to achieve evenness of the ground-contact pressure in the center block 21 by the first sipe 27 in the central portion in the tire-width direction X in which the ground-contact pressure is high, thus, it is possible to improve the wear resistance, and it is possible to improve the traction performance by disposing the first sipe 27 at a position shifted from the orthogonal extension line L in the tire-circumferential direction Y. Note that, in the second embodiment, the other configurations and operations and effects are the same as the first embodiment, and thus the description thereof is omitted.

Other Embodiments

In the embodiment, a case where the block rows comparted by the first circumferential grooves 11 and the second circumferential groove 12 are positioned in the central portion in the tire-width direction X including the tire equatorial plane E is described; however, the embodiment is not limited to the tread pattern as described above. For example, the block row comparted by the first circumferential grooves 11 and the second circumferential groove 12 may be positioned to the outer side in the tire-width direction X by the tire equatorial plane E. In addition, in the embodiment, a case where five circumferential grooves are provided to extend in the circumferential direction is described; however, three or more circumferential grooves may be used in the invention. In addition, in the embodiment, a case where the first transverse groove 14 or the second transverse groove 15 is inclined with respect to the tire-width direction X is described; however, the grooves may be provided in parallel in the tire-width direction X.

Examples of the pneumatic tire according to the embodiment include tires for various types of vehicles such as a tire for a passenger car, a tire for a light truck such as an SUV car or a pick-up truck, or a tire for a heavy load such as a truck or a bus. In addition, there is no particular limitation on a use such as a summer tire, a winter tire, or all-season tire.

As described above, some embodiments of the invention are described; however, the embodiments are provided as only examples, and are not provided to limit a scope to the invention on purpose. The embodiments can be realized in various other forms, and various omissions, replacements, or modifications of the embodiments can be performed within a range without departing from the gist of the invention. The embodiment or modified embodiments thereof are included in the scope or the gist of the invention, and, similarly, are included in the invention and the scope equivalent to the invention described in the claims.

EXAMPLE

In order to verify the effects described above, pneumatic tires (tire size: 11R22.5) of Examples 1 and 2 and Comparative Examples 1 and 2 were mounted on rims of 22.5×7.50, were filled with internal pressure of 700 kPa, and were mounted on vehicles having a normal loading capacity of 10 t, and the uneven wear resistance and the traction performance were evaluated.

Figure 6:
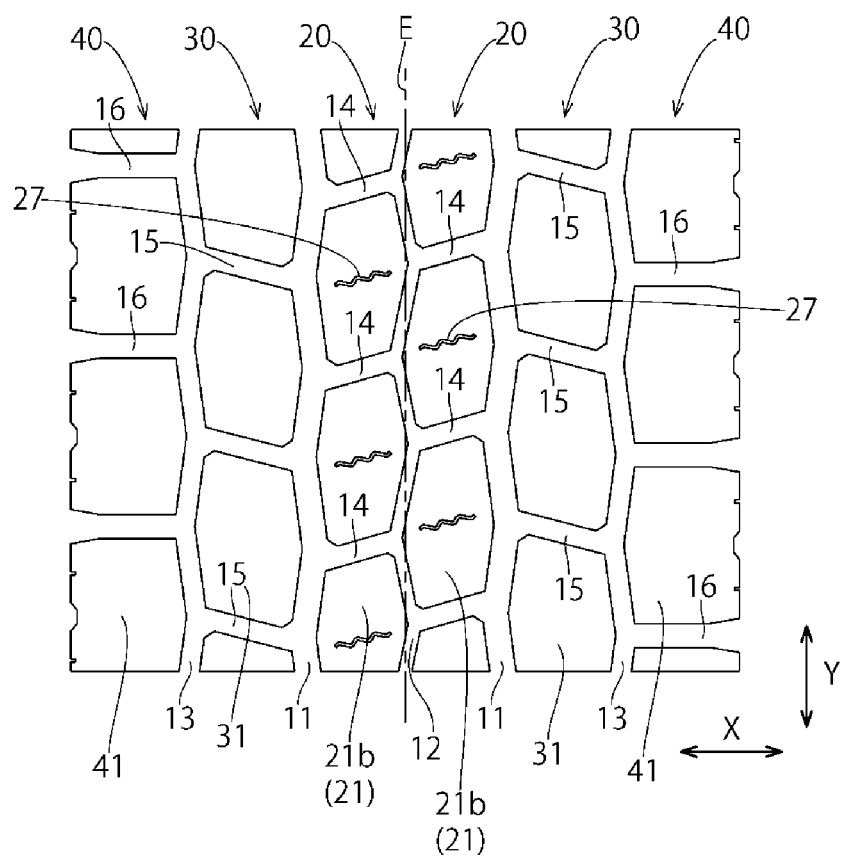
FIG. 6 is a development view illustrating main parts of a tread portion of a pneumatic tire according to a second embodiment.

Example 1 is a tire having the tread pattern of the second embodiment illustrated in FIG. 6, and Example 2 is a tire having the tread pattern of the first embodiment illustrated in FIG. 2.

Figure 7A:
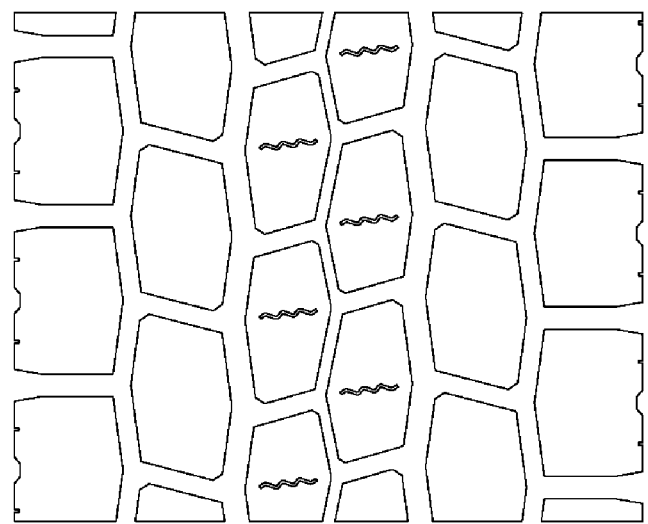
FIG. 7A is a development view illustrating main parts of a tread portion of a pneumatic tire of Comparative Example 1.
Figure 7B:
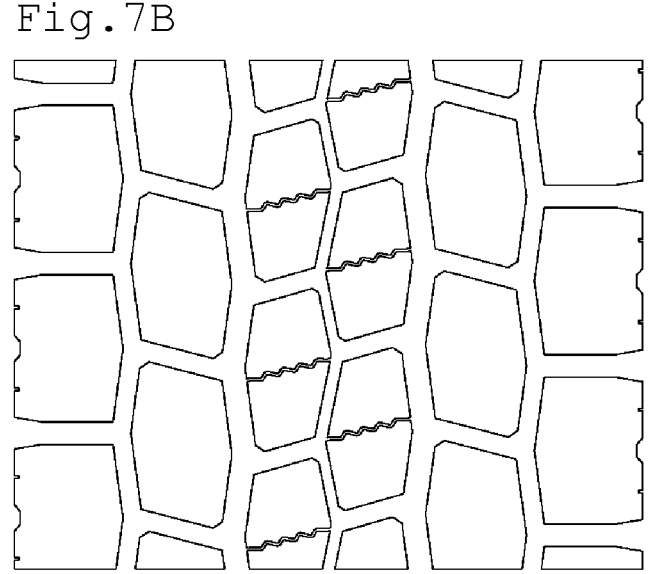
FIG. 7B is a development view illustrating main parts of a tread portion of a pneumatic tire of Comparative Example 2.

The tire of Comparative Example 1 is a tire having the tread pattern illustrated in FIG. 7A and differs from Example 1 in that the sipes provided in the center block are disposed to be coincident with the diagonal extension line, and the other configurations are the same as Example 1. The tire of Comparative Example 2 is a tire having the tread pattern illustrated in FIG. 7B and differs from Example 1 in that the sipes provided in the center block are opened to the first circumferential grooves and the second circumferential groove, and the other configurations are the same as Example 1.

Evaluation methods are as follows.

Uneven wear resistance: an unevenness state (heel-and-toe wear amount) was measured after driving of 20,000 km, and the reciprocal of the heel-and-toe wear amount was indexed with values of Comparative Example 1 as 100. As the index increases, an occurrence of uneven wear decreases, and the high uneven wear resistance is obtained.

Traction performance: arrival time from a stopping state to a time point, at which the driving is performed by 20 m on a road surface having a depth of water of 1.0 mm, was measured, and the reciprocal of the arrival time was indexed with values of Comparative Example 1 as 100. As the index increases, the arrival time is shortened, and high traction performance is achieved.

TABLE 1

| | Comparative Example 1 | Comparative Example 2 | Example 1 | Example 2 |
|---|---|---|---|---|
| Uneven wear resistance | 100 | 91 | 103 | 102 |
| Traction performance | 100 | 109 | 105 | 118 |

As shown in Table 1, the results verified that, in Comparative Example 2, since the sipes provided in the center block were opened in the circumferential grooves, the high traction performance is achieved; however, the uneven wear resistance was verified to be significantly lower than that of Comparative Example 1.

In comparison, in Examples 1 and 2, higher uneven wear resistance and high traction performance are exhibited than those in Comparative Example 1.

What is claimed is:

1. A pneumatic tire comprising:
    a tread portion,
    wherein the tread portion is provided with three circumferential grooves extending to have a zigzag shape in a tire-circumferential direction, a plurality of first transverse grooves that connect the circumferential grooves adjacent to each other in a tire-width direction and extend in the tire-width direction, and two block rows provided between the circumferential grooves adjacent to each other in the tire-width direction, wherein each block row is provided with a plurality of blocks divided by the first transverse grooves in the tire-circumferential direction, wherein each block has a hexagonal shape of which a central portion in the tire-circumferential direction is widened in the tire-width direction, has a diagonal extension line as a straight line passing through a pair of vertices positioned in the central portion in the tire-circumferential direction, the diagonal extension line overlapping, in the tire-circumferential direction, the first transverse groove of the adjacent block rows, and has a first sipe that is terminated within a block extending in the tire-width direction, and wherein the entire first sipe is disposed at a position shifted from the diagonal extension line in the tire-circumferential direction and in a region interposed between planes that are formed by extending, in a direction in which the first transverse groove extends, from a pair of groove wall surfaces of the first transverse groove provided in the adjacent block rows;

wherein the three circumferential grooves include a pair of first circumferential grooves provided at an interval in the tire-width direction with the tire equatorial plane interposed therebetween, and a second circumferential groove provided between the first circumferential grooves, wherein the tread portion is provided with a third circumferential groove extending to have a zigzag shape in the tire-circumferential direction on an outer side of the first circumferential groove in the tire-width direction, a second transverse groove that connects the first circumferential groove and the third circumferential groove to each other, and an outer block row provided between the first circumferential groove and the third circumferential groove, wherein the outer block row has a plurality of outer blocks divided by the second transverse grooves in the tire-circumferential direction, wherein the first transverse groove extends to be inclined in the tire-circumferential direction with respect to the tire-width direction, wherein the second transverse groove extends to be inclined in an opposite direction to the first transverse groove with respect to the tire-width direction, wherein the outer block has a shape of which the central portion in the tire-circumferential direction is widened in the tire-width direction, and is provided with a notch in the central portion in the tire-circumferential direction, wherein the outer block is provided with the second sipe that is opened in the notch, and wherein the second sipe has a wave shape extending in a sipe-length direction while a curve or a bent portion are repeated, and extends in a sipe-depth direction while the wave shape is displaced to one side in the sipe-length direction.

2. The pneumatic tire according to claim 1,
wherein the first sipe has a wave shape extending in a sipe-length direction while a curve or a bent portion are repeated, and extends in a sipe-depth direction while the wave shape is displaced to one side in the sipe-length direction.

3. The pneumatic tire according to claim 1,
wherein the block has long side portions extending from a pair of vertices positioned in the central portion in the tire-circumferential direction to vertices adjacent to each other on one side in the tire-circumferential direction, and short side portions that extend to vertices adjacent to each other on the other side in the tire-circumferential direction and are shorter than the long side portions, and
wherein the first sipe is positioned to be shifted from the diagonal extension line to the long side portion.

4. The pneumatic tire according to claim 1,
wherein the three circumferential grooves include a pair of first circumferential grooves provided at an interval in the tire-width direction with the tire equatorial plane interposed therebetween, and a second circumferential groove provided between the first circumferential grooves, and
wherein the second circumferential groove has a groove width narrower than that of the first circumferential groove.

5. The pneumatic tire according to claim 2,
wherein the block has long side portions extending from a pair of vertices positioned in the central portion in the tire-circumferential direction to vertices adjacent to each other on one side in the tire-circumferential direction, and short side portions that extend to vertices adjacent to each other on the other side in the tire-circumferential direction and are shorter than the long side portions, and
wherein the first sipe is positioned to be shifted from the diagonal extension line to the long side portion.

6. The pneumatic tire according to claim 2,
wherein the three circumferential grooves include a pair of first circumferential grooves provided at an interval in the tire-width direction with the tire equatorial plane interposed therebetween, and a second circumferential groove provided between the first circumferential grooves, and
wherein the second circumferential groove has a groove width narrower than that of the first circumferential groove.

7. The pneumatic tire according to claim 3,
wherein the three circumferential grooves include a pair of first circumferential grooves provided at an interval in the tire-width direction with the tire equatorial plane interposed therebetween, and a second circumferential groove provided between the first circumferential grooves, and
wherein the second circumferential groove has a groove width narrower than that of the first circumferential groove.

8. The pneumatic tire according to claim 2,
wherein the three circumferential grooves include a pair of first circumferential grooves provided at an interval in the tire-width direction with the tire equatorial plane interposed therebetween, and a second circumferential groove provided between the first circumferential grooves,
wherein the tread portion is provided with a third circumferential groove extending to have a zigzag shape in the tire-circumferential direction on an outer side of the first circumferential groove in the tire-width direction, a second transverse groove that connects the first circumferential groove and the third circumferential groove to each other, and an outer block row provided between the first circumferential groove and the third circumferential groove, wherein the outer block row is provided with a plurality of outer blocks divided by the second transverse grooves in the tire-circumferential direction, wherein the first transverse groove extends to be inclined in the tire-circumferential direction with respect to the tire-width direction, wherein the second transverse groove extends to be inclined in an opposite direction to the first transverse groove with respect to the tire-width direction, and wherein the outer block has a shape of which the central portion in the tire-circumferential direction is widened in the tire-width direction and is provided with a notch in the central portion in the tire-circumferential direction.

9. The pneumatic tire according to claim 3, wherein the three circumferential grooves include a pair of first circumferential grooves provided at an interval in the tire-width direction with the tire equatorial plane interposed therebetween, and a second circumferential groove provided between the first circumferential grooves, wherein the tread portion is provided with a third circumferential groove extending to have a zigzag shape in the tire-circumferential direction on an outer side of the first circumferential groove in the tire-width direction, a second transverse groove that connects the first circumferential groove and the third circumferential groove to each other, and an outer block row provided between the first circumferential groove and the third circumferential groove, wherein the outer block row is provided with a plurality of outer blocks divided by the second transverse grooves in the tire-circumferential direction, wherein the first transverse groove extends to be inclined in the tire-circumferential direction with respect to the tire-width direction, wherein the second transverse groove extends to be inclined in an opposite direction to the first transverse groove with respect to the tire-width direction, and wherein the outer block has a shape of which the central portion in the tire-circumferential direction is widened in the tire-width direction and is provided with a notch in the central portion in the tire-circumferential direction.

10. The pneumatic tire according to claim 4, wherein the three circumferential grooves include a pair of first circumferential grooves provided at an interval in the tire-width direction with the tire equatorial plane interposed therebetween, and a second circumferential groove provided between the first circumferential grooves, wherein the tread portion is provided with a third circumferential groove extending to have a zigzag shape in the tire-circumferential direction on an outer side of the first circumferential groove in the tire-width direction, a second transverse groove that connects the first circumferential groove and the third circumferential groove to each other, and an outer block row provided between the first circumferential groove and the third circumferential groove, wherein the outer block row is provided with a plurality of outer blocks divided by the second transverse grooves in the tire-circumferential direction, wherein the first transverse groove extends to be inclined in the tire-circumferential direction with respect to the tire-width direction, wherein the second transverse groove extends to be inclined in an opposite direction to the first transverse groove with respect to the tire-width direction, and wherein the outer block has a shape of which the central portion in the tire-circumferential direction is widened in the tire-width direction and is provided with a notch in the central portion in the tire-circumferential direction.

* * * * *